United States Patent [19]

Baudermann

[11] 3,888,161
[45] June 10, 1975

[54] CUTTING PROCESS AND DEVICE FOR PRODUCING PARALLEL-FLANKED GROOVES

[75] Inventor: Adolf Baudermann, Neckarhausen, Germany

[73] Assignee: Cross Europa-Werk GmbH, Wendlingen, Germany

[22] Filed: Aug. 29, 1973

[21] Appl. No.: 392,641

[30] Foreign Application Priority Data
June 4, 1973 Germany.......................... 2328372

[52] U.S. Cl.................. 90/11 C; 90/11 A; 144/90 A; 144/85
[51] Int. Cl.......... B23b 3/28; B27f 1/02; B27f 1/06
[58] Field of Search................ 90/11 A, 11 C, 90 A; 144/85, 86, 89

[56] References Cited
UNITED STATES PATENTS

| | | | |
|---|---|---|---|
| 144,536 | 11/1873 | Hamilton | 144/85 |
| 1,058,441 | 4/1913 | Kelly | 144/85 |
| 3,183,779 | 5/1965 | Nagel | 90/11 A |

*Primary Examiner*—Gil Weidenfeld
*Attorney, Agent, or Firm*—Harness, Dickey & Pierce

[57] ABSTRACT

The present invention relates to a milling machine and method for accurately cutting grooves in a workpiece and is especially well suited in cutting exactly dimensioned, narrow, and in particular parallel-flanked grooves in a limited area of a production part.

20 Claims, 9 Drawing Figures

CUTTING PROCESS AND DEVICE FOR PRODUCING PARALLEL-FLANKED GROOVES

BACKGROUND AND SUMMARY OF THE INVENTION

The present invention relates to a milling machine and method for accurately cutting grooves in a workpiece and is especially well suited in cutting exactly dimensioned, narrow, and in particular parallel-flanked grooves in a limited area of a production part.

Although parallel-flanked, straight, narrow grooves can essentially be produced with side milling cutters, curved grooves (for example, ring-shaped grooves) cannot be produced with such sidemilling cutters. The production of such ring-shaped curved grooves is essentially possible by means of bell cutters, but in this case, as can be shown theoretically, only an approximate parallelism of the groove flanks can be achieved; this is not desirable for applications where especially narrow tolerances are concerned (for example, in the insertion of packing strips). Producing grooves by the use of endmilling cutters is not economical for narrow grooves.

The invention therefore has as one object the provision of method and apparatus which provides bowed, curved or straight grooves with narrow tolerances and a high surface quality of the groove walls on a high production basis.

According to the present disclosure, one embodiment of the invention has a cutter with two cutting edges, displaced axially and circumferentially with respect to one another. This fly cutter rotates around an axis of rotation perpendicular to the groove being cut. One of the two cutting edges points toward the front side and the other toward the back side of the toothed fly cutter with one cutting edge cutting one wall of the groove and the other cutting edge the other wall of the groove. A continuous relative feed motion of the work into the cutter is generally perpendicular to the axis of rotation. The cutting edges are respectively guided relative to the production part on an imaginary curved space curve situated between the sidewalls of the groove being cut. Each of the cutting edges is alternately advanced tangentially on a plane or curved surface toward the respective groove wall which it cuts. One edge is brought into attack on the production part in producing its groove wall, while the other respective cutting edge remains out of attack on the production part, the edges alternately attacking the work as the cutter rotates.

It is possible, in principle, to move the production part with the toothed fly cutter held axially stationary, such that the cutting edges of the toothed fly cutter pass through the above mentioned space curve relative to the production part; however, particularly advantageous results are attained when the toothed fly cutter is given a periodic reciprocating axial motion correlated with the attack frequency of the cutting edges, which depends on the rotary motion of the toothed fly cutter. The maximum axial reciprocal stroke of the cutter is equal to the difference between the axial distance between the cutting edges and the width of the grooves. It is especially advantageous for the periodic axial reciprocal motion to be sinusoidal.

The new process yields exactly dimensioned grooves, despite the fact that the cutting edges of the toothed fly cutter are moving on a space curve. When the cutting edges of the toothed fly cutter are parallel to one another, the grooves show parallel flanks. However, it is also conceivable to use a toothed fly cutter, the cutting edges of which are, for example, inclined outwardly or inwardly, so that narrow-tolerance grooves with either V-shaped or dovetailed cross sections are cut.

The width of the particular groove to be produced can be adjusted accurately by a suitable choice of the space curve, or in the periodic reciprocating motion of the toothed fly cutter by a suitable setting of the stroke of the axial motion.

The high surface quality is insured by a suitably high cutting speed, in which connection it is particularly advantageous that, as will later be explained in detail, the cutting edges are again moved along their respective space curves after the attack on the assigned groove sidewall, so that any fuller cutting and the resulting damage to the surface quality of the groove sidewall are eliminated.

For performing the new process, a milling machine has a spindle and an associated feed mechanism connected therewith for producing a continuous feed movement of the workpiece perpendicular to the spindle's axis of rotation. According to the invention, the milling cutter has two cutting edges axially and circumferentially displace (or offset) with respect to one another arranged on the cutter spindle. One cutting edge points toward the front and the other points toward the back. The milling machine includes a reciprocating mechanism coupled with the cutter spindle through which mechanism a periodic reciprocating motion can be imparted to the spindle in strict dependence on the rotory motion of the toothed fly cutter. The maximum stoke of this axial reciprocal motion is equal to the difference between the axial distance between the cutting edges and the groove width and the frequency of which is the same as the attack frequency of the cutting edges.

In one preferred embodiment, a circularly rotating inclined cam surface is rotatably affixed to the cutter spindle. This cam surface is by spring action resiliently urged axially against a stationary support. This cam surface can be adjusted with respect to the cutter spindle, in order thereby to adjust the stroke of the axial reciprocal motion of the toothed fly cutter.

The mechanism is arranged so that the cam surface is fashioned on a ring affixed in a rotationally rigid manner to the cutter spindle, which ring can be arranged so to be adjustable in its oblique position with respect to the cutter spindle.

If a number of parallel grooves are to be produced at the same time, then at least two coaxial toothed fly cutters are arranged on the cutter spindle, spaced apart axially.

BRIEF DESCRIPTION OF THE DRAWINGS

The accompanying drawings illustrate the principles of the present invention.

Figure 1:
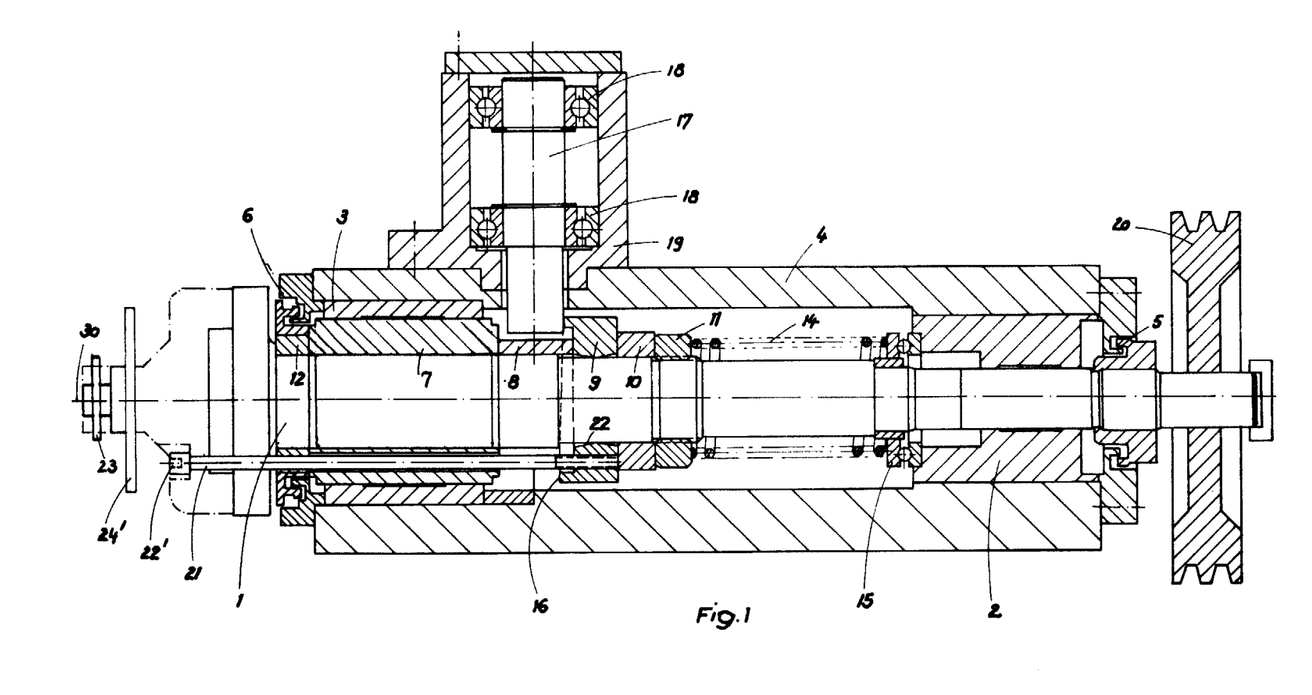
FIG. 1 is a longitudinal sectional view of a milling machine according to the invention.
Figure 2:
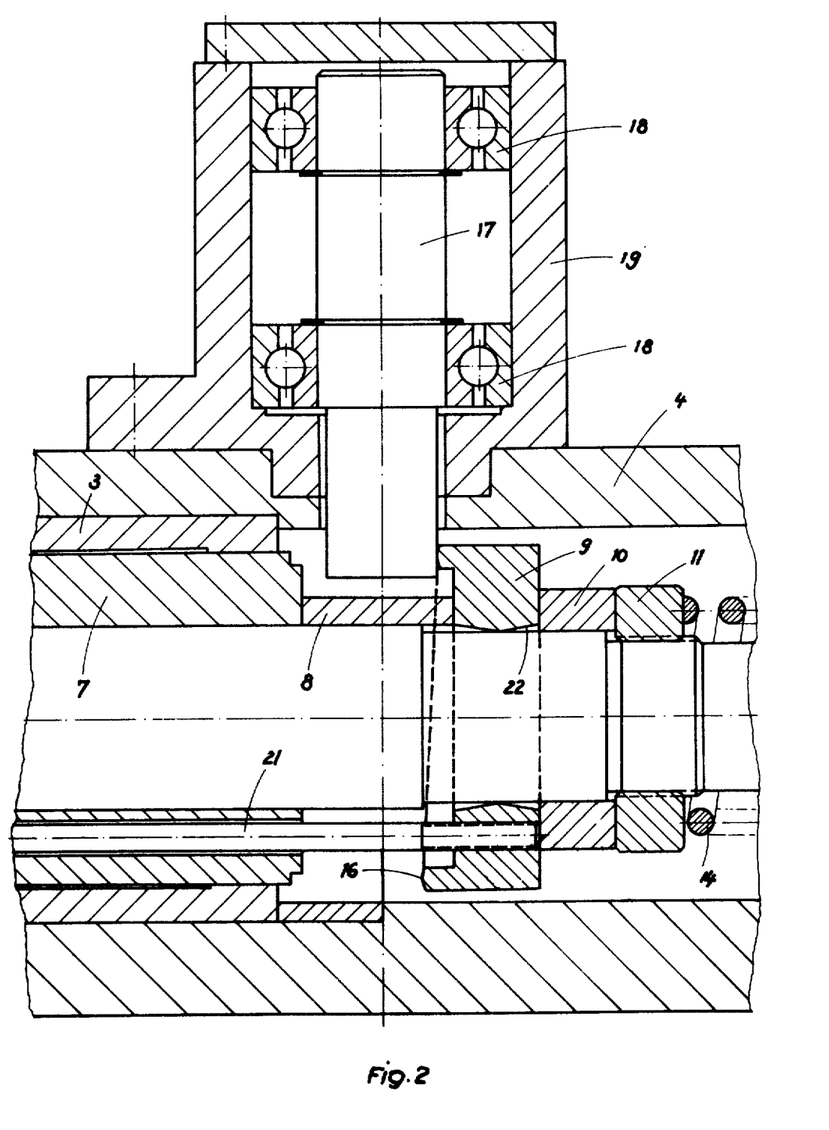
FIG. 2 is an enlarged fragmentary view of a portion of FIG. 1.

The cutter spindle 1, represented in FIGS. 1 and 2, is pivoted in two sliding bearings 2, 3 in a stationary casing 4 and capable of limited axial movement. The bearings 2, 3 are axially sealed against the casing 4 by two labyrinth seals 5, 6. The bearing 3 turns on a bushing 7 attached to the spindle 1, which is axially urged against a shoulder 12 by means of a space bushing 8, a cam ring 9 and a spacing piece 10 through a screwed-on nut 11. A compression spring 14 presses against the nut 11 which is braced at the end by way of a thrust bearing 15 against the bearing 2 firmly attached to the casing 4.

The cam ring 9 carries on its front side an inclined cam surface 16, which is braced by the action of the compression spring 14 against a stationary support in the form of a bolt 17 which is journaled by means of the bearings 18 within a bearing casing firmly joined to the casing 4. The axis of rotation of bolt 17 is perpendicular to the axis of rotation of the cutter spindle 1.

The cutter spindle 1 is driven by a drive source (not shown) for example a motor, through a V-belt pulley 20 keyed onto it in a rotationally rigid manner. The cam ring 9 attahced rotationally rigidly to the cutter spindle 1 is driven in turn, and thereby the cam surface 16 is moved with respect to the stationary bolt 17. In this way the cutter spindle 1 is imparted a periodic reciprocating axial motion which is sinusoidal for a corresponding shape of the cam surface.

In order to change the stroke of this axial motion, the oblique position of the cam ring 9 relative to the cutter spindle 1 can be changed. For this purpose an adjusting screw 21 is screwed into a corresponding threaded hole of the cam ring 9, which screw is rotatable from the outside as at 22' and which at its inside end is supported on the spacing piece 10. The cam ring 9 is made spherical in the region of its hole at 22, so that it can be inclined more or less with respect to the cutter spindle 1 by a suitable adjustment of the adjusting screw 21.

Figures 3, 5:
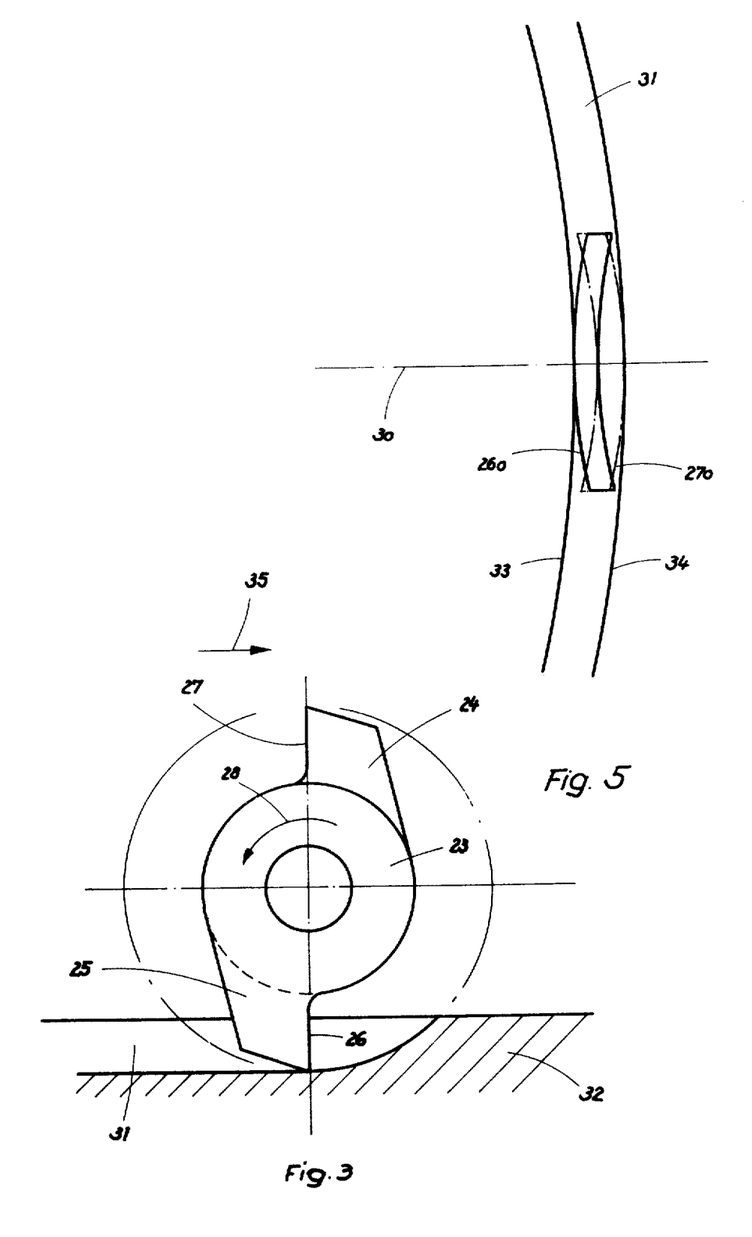
FIG. 3 is an end view of the toothed fly cutter affixed to the cutter spindle of FIG. 1, and shown cutting a groove in a workpiece.
FIG. 5 is a top plan view diagrammatically showing a cutaway portion of the space curve onto which the cutting edges of the toothed fly cutter according to FIGS. 3 and 4 are guided in producing a curved groove.
Figure 4:
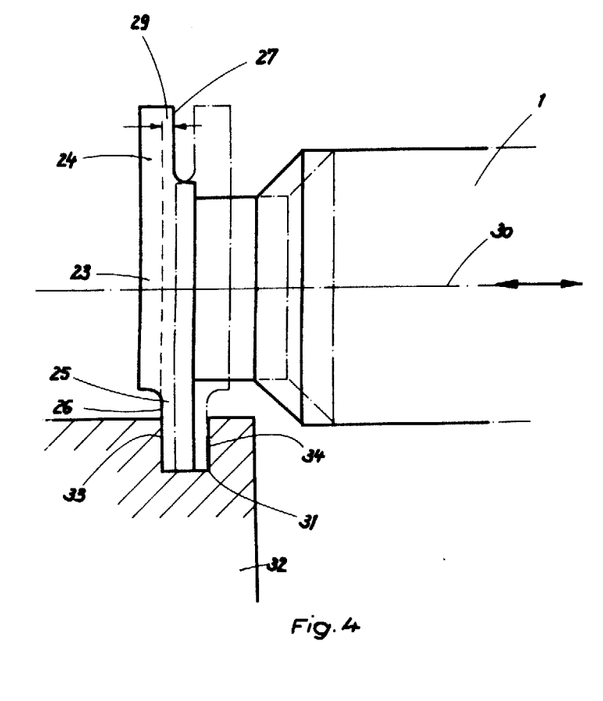
FIG. 4 is a longitudinal view of a cutter illustrating two different positions of the toothed cutter.

On the cutter spindle 1 are situated two coaxial toothed fly cutters 23, 24' which are arranged axially spaced apart, and of which the toothed fly cutter 23 in FIG. 1, 2 in particular is shown in FIGS. 4 and 5, it being noted that in FIGS. 4 and 5 the second toothed fly cutter 24' is omitted.

The toothed fly cutter 23 in the disclosed embodiment has two fly cutter teeth 24, 25 displaced circumferentially 180° apart, which teeth bear cutting edges 26 and 27 respectively lying forward in the rotation direction indicated at 28 in FIG. 3. The two cutting edges 26, 27, as FIG. 4 shows, are displaced axially with respect to one another, the axial distance between the two cutting edges being shown at 29.

The axis of rotation 30 of the cutter spindle 1 runs perpendicularly to the groove 31 being cut in a production part 32. Groove 31 has two parallel groove sidewalls 33, 34 and is curved in the manner shown in FIG. 5.

The cutter spindle 1 is attached to a feed mechanism (not detailed in the drawings) which makes it possible to cuase a continuous relative feed motion perpendicularly to the axis of rotation 30 of the cutter spindle 1 between the production part 32 and the cutter spindle 1. The direction of feed is indicated in FIG. 3 by an arrow 35. If the cutter spindle 1 is driven in the direction of the arrow 28 (FIG. 3) and at the same time a feed motion is created in the direction of the arrow 35, then because of the action of the cam surface 16 with bolt 17 a periodic reciprocating axial motion of the cutter spindle 1, and hence of the toothed fly cutter 23, occurs. This reciprocal axial motion is adjusted to the rotary motion of the toothed fly cutter 23 by a suitable choice of the angular position of the cam ring 9 relative to the toothed fly cutter 23 in such a way that the cutting edges 26, 27 are respectively guided on curved or bowed space curves which run between the sidewalls 33, 34 of the groove 31 to be produced and are diagrammatically illustrated in FIG. 5. Here the space curve described by one cutting edge 26 during cutting is illustrated at 260, while the space curve described by the other cutting edge 27 during cutting is illustrated at 270. There are also shown the parallel space curves described by the cutter edges opposite to the respective cutting edges 26 and 27. As is seen from FIG. 5, during the forward motion of the cutter spindle, the cutting edge 26 is moved forward tangentially on the space curve 260 on a curved or bowed surface toward the groove sidewall 33 and in producing the groove wall 33 is brought into attack on the production part 32; at the same time the other cutting edge 27 remains out of attack on the production part. On the other side, the space curve 270 shows that during the backward motion of the cutter spindle 1, the other cutting edge 27 is moved tangentially on a curved surface toward groove sidewall 34 and is then in turn brought into attack on the production part 32 to produce the groove sidewall 34, this attack position being represented in broken lines in FIG. 4. The space curves 260, 270 also show that during the attack of one of the cutting edges 26, 27 not only is the other cutting edge out of attack, but that when one cutting edge comes out of the groove, the cutting edge is at the same time raised in conformity with the space curve, so that any fuller cutting and the resulting damage to the surface quality are eliminated.

The second toothed fly cutter 24' represented in FIG. 1 serves to produce a second parallel groove at the same time, in the same manner described for the toothed fly cutter 23, which second groove would show different dimernsions in the present case with the represented dimensions of the two toothed fly cutters 23, 24'.

In place of the two-cutting-edge toothed fly cutter 23 represented in the drawings, it would also be conceivable to use toothed fly cutters with more cutting edges.

The width of the particular groove 31 produced can be adjusted by changing the stroke of the axial motion of the cutter spindle 1. This changing of the stroke is done in the manner already described by an appropriate setting of the adjusting screw 21 to adjust the cam ring 9 in its oblique position relative to the cutter spindle 1. The relation between the groove width and the preset stroke of the axial motion of the cutter spindle 1 is found from the fact that the maximum stroke of the cutter spindle 1 is the same as the difference between the axial spacing 29 of the two cutting edges 26, 27 and the groove width. Moreover the cam surface 16 is shaped in such a way that the frequency of the axial reciprocating motion of the cutter spindle 1 is the same as the attack frequency of the cutting edges of the toothed fly cutter.

The process explained can also be used for the production of straight narrow grooves of high dimensional accuracy, and it is also possible to produce grooves with oblique groove sidewalls, for example, with a V-shaped cross section with the use of appropriately shaped toothed fly cutters.

In particular, dovetailed grooves and corresponding tongue and groove joints can also be produced in metal, wood, plastic and similar materials by the new process. These are illustrated in FIGS. 6 to 9.

Figure 6:
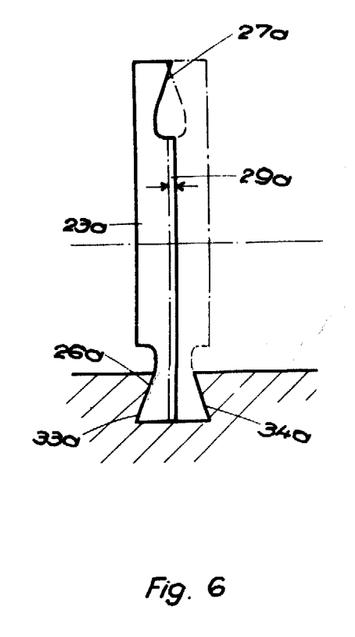
FIG. 6 is a view similar to FIG. 4 illustrating another form a cutter.
Figure 8:
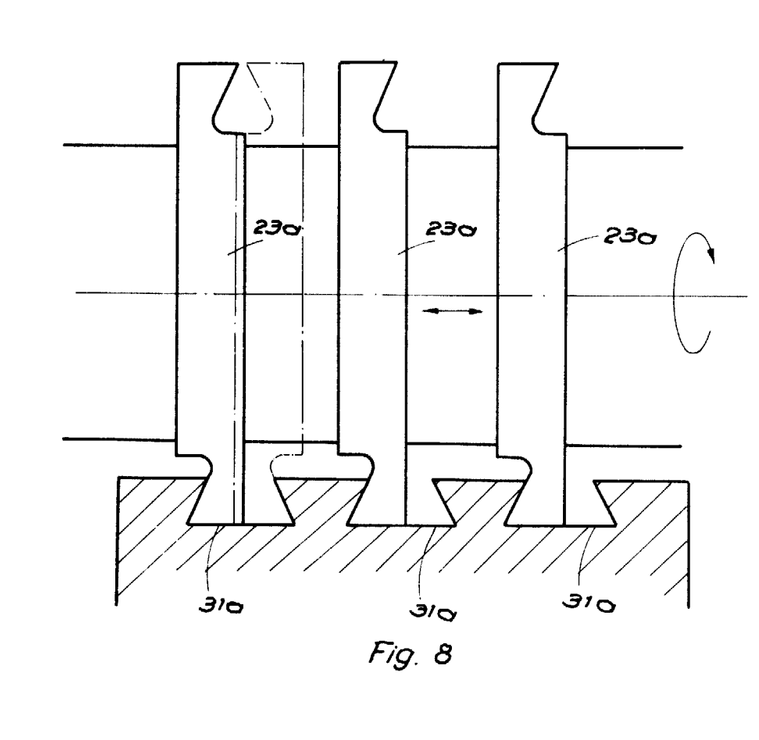
FIG. 8 is a view showing three toothed fly cutters on a cutter spindle with an illustration of two different positions of the toothed fly cutters.

The toothed fly cutters represented in FIGS. 6 and 8 differ from the toothed fly cutter 23 only in the position of their cutting edges. For this reason the corresponding parts are designated with the same reference symbols, to which only the suffix *a* or *b* is added for differentiation.

Figure 7:
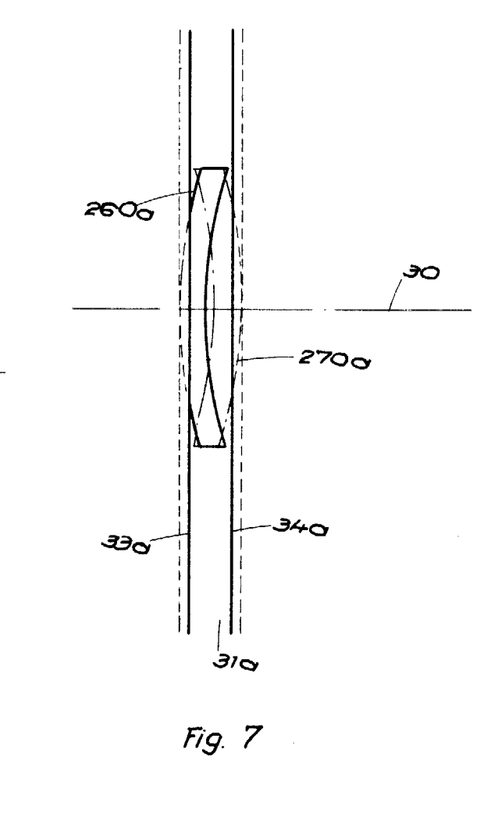
FIG. 7 is a top plan view diagrammatically showing a cutaway portion of the space curve on which the cutting edges of the toothed fly cutter according to FIG. 6 are guided in producing a straight groove.

In contrast to the straight cutting edges 26, 27 lying in two parallel planes, of the toothed fly cutter 23, the corresponding cutting edges 26*a*, 27*a* of the toothed fly cutter 23*a* according to FIG. 6 are arranged pointing obliquely outward and situated on lateral cone surfaces or arcs coaxial to the axis of rotation 30. The cutting edges 26*a*, 27*a* therefore produce in the production piece a dovetailed groove with obliquely converging groove sidewalls 33*a*, 34*a* in the manner evident in FIG. 6. Here the cutting edges 26*a*, 27*a* in the manner evident from FIG. 7 are guided on corresponding space curves 260*a*, 270*a* in the same way as was already explained on the basis of FIG. 5. Although a straight groove 31*a* is represented in FIG. 7 as an example a groove which can be cut with the invention, it will be understood that curved dovetailed grooves 31*a* can also be produced, the shape of which essentially corresponds to the curve shape according to FIG. 5.

If a plurality of toothed fly cutters 23*a* according to FIG. 6 are attached to the cutter spindle 1 in axially spaced apart fashion as in FIG. 8, then a plurality of parallel dovetailed grooves 31, adjacent and spaced apart, can be produced at the same time. In this manner it is possible, for example to produce the grooves of a so-called dovetailing all at once.

Figure 9:
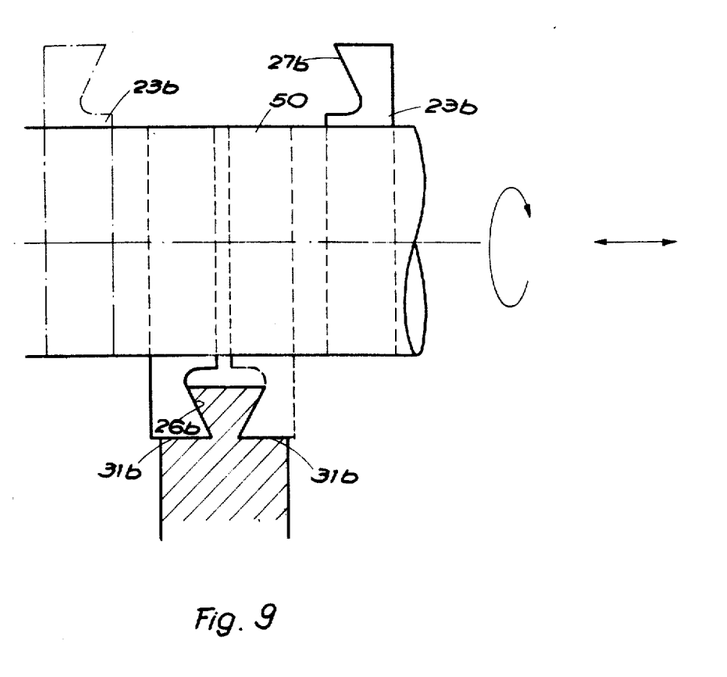
FIG. 9 is a view showing a toothed fly cutter in the form of a cutter blade inserted in a cutter spindle or a boring bar, for producing a dovetailed tongue.

Whereas the toothed fly cutter 23*a* was attached onto the cutter spindle in the arrangement according to FIG. 8, which cutter is essentially similar to the toothed fly cutter 23 according to FIG. 3, it is also conceivable, especially for woodworking purposes, to insert cutters 23*a* in a rotating tool body which is connected with the spindle and is represented diagrammatically at 50 in FIG. 9, the cutting edtes 26*b*, 27*b* of which cutters correspond to the cutting edges 26*a*, 27*a* of the toothed fly cutter according to FIG. 6.

Here the dovetailed grooves 31*b* produced in FIG. 9 exist only in a half form, so that in this form of construction only one standing tongue or feather of dovetailed cross section is produced between two such groove portions 31*b*.

What is claimed is:

1. The method of cutting a sidewall of a groove in a workpiece which comprises the steps of: providing a rotary cutter having a central body portion and at least on radially extending cutting portion rigidly connected thereto and a cutting edge along said radial cutting portion; rotating the cutter about its axis to bring the cutting edge thereof into the workpiece and simultaneously axially advancing the cutter as a unit toward the desired finished surface of the sidewall until the rotating cutting edge is tangent therewith; thereafter continuing to rotate the cutter in the same direction but now axially retracting the cutter to move the rotating cutting edge thereof away from the desired finished surface of the sidewall, and repeating the foregoing steps while the workpiece and the cutter are fed relative to each other along the path of the groove, the cutter being axially reciprocated once per each revolution of the cutting edge with a sinusoidal motion.

2. A cutting process for producing an accurately dimensioned groove in a workpiece which comprises the steps of: providing a rotating cutter having a central body poriton and a pair of radially extending cutting portions rigidly connected thereto and a cutting edge along each of said radial cutting portions, said cutting edges being axially and circumferentially spaced and facing in opposite directions rotating the cutter about its axis and into the workpiece to successively attack the workpiece with said cutting edges; axially reciprocating the cutter as a unit in relation to the successive attacks on said cutting edges on the workpiece such that as one cutting edge attacks the workpiece the cutter is advanced axially toward the desired finished surface of one sidewall of the groove until said one cutting edge lies tangent to the desired finished surface of said one sidewall, and then is axially retracted away from said one sidewall and as the other cutting edge attacks the workpiece, the cutter is axially retracted until said other cutting edge lies tangent to the desired finished surface of said other sidewall of the groove and then is axially advanced away from said other sidewall; and repeating the foregoing steps while the workpiece and cutter and fed toward each other along the path of the desired groove.

3. The process as claimed in claim 2, wherein at any given time at most one of said cutting edges is attacking the workpiece.

4. The process as claimed in claim 2 wherein the cutter is axially advanced and retracted with a sinusoidal motion.

5. The process as claimed in claim 2 wherein the cutter and the workpiece are fed relative to each other along a curved path of travel to thereby form curved sidewalls of the groove.

6. The method of milling an accurately dimensioned groove in a workpiece comprising the steps of: providing a cutter having a central body portion and a pair of radially extending cutting portions rigidly connected thereto and a cutting edge along each of said radial cutting portions, said cutting edges being axially and circumferentially spaced and facing in opposite directions each of which is for cutting one of the sidewalls of the groove; and rotating the cutter about its axis and simultaneously axially reciprocating the cutter as a unit such that the cutting edges alternately attack the workpiece to cut the groove with one cutting edge approaching the desired finished surface of one sidewall of the groove along a curve tangent to the desired finished surface of said one sidewall as said one cutting edge attacks the work, and the other cutting edge approaches the desired finished surface of the other sidewall of the groove along a curve tangent to the desired finished surface of said other sidewall as said other cutting edge attacks the work.

7. The method as claimed in claim 6 wherein the cutter is axially reciprocated with a sinusoidal motion.

8. The method as claimed in claim 6 wherein at any given time at most one of said cutting edges is attacking the workpiece.

9. Apparatus for cutting a groove in a workpiece comprising: a spindle being rotatable about its axis, a cutter affixed to said spindle for rotation therewith, said cutter comprising a central body portion and a pair of radially extending cutting portions rigidly connected thereto and a cutting edge along each of said radial cutting portions, said cutting edges being axially and circumferentially spaced in fixed relation to each other and facing in opposite directions and means for axially reciprocating the spindle cutter in synchronism with the rotation of the spindle such that each cutting edge, upon attacking the workpiece, approaches and departs from the desired finished surface of a corresponding sidewall of the groove along a curve which is tangent to the desired finished surface of the corresponding sidewall of the groove.

10. Apparatus as claimed in claim 9 wherein said means for axially reciprocating the spindle in synchronism with the rotation of the spindle comprises cam means and cam follower means.

11. Apparatus as claimed in claim 10 wherein one of said cam means and said cam follower means is affixed to said spindle and the other of said cam means and said cam follower means is affixed to the apparatus.

12. Apparatus as claimed in claim 11 wherein said cam means comprises a cam ring having an annular cam surface, said cam ring being affixed to said spindle.

13. Apparatus as claimed in claim 12 wherein said cam surface has means shaped to impart a sinusoidal motion to said spindle.

14. Apparatus as claimed in claim 12 including bias means axially biasing the cam surface of said cam ring into engagement with said cam follower means.

15. Apparatus as claimed in claim 14 wherein said cam follower means comprises a bolt disposed radially of the spindle.

16. Apparatus as claimed in claim 14 wherein said bias means comprises a compression spring.

17. Apparatus as claimed in claim 9 including means for adjusting the stroke of the axial reciprocation of the spindle.

18. Apparatus as claimed in claim 9 wherein the circumferential distance between said cutting edges is arranged such that at any given time at most one of said cutting edges is attacking the workpiece.

19. Apparatus as claimed in claim 18 wherein said cutting edges are 180° apart circumferentially.

20. Apparatus as claimed in claim 9 wherein said cutting edges are oblique with respect to the spindle.

* * * * *